(12) United States Patent
Wei et al.

(10) Patent No.: US 12,547,233 B2
(45) Date of Patent: Feb. 10, 2026

(54) VOLTAGE REGULATOR CONTROL WITH SCALABLE POWER STAGE

(71) Applicant: RENESAS ELECTRONICS AMERICA INC., Milpitas, CA (US)

(72) Inventors: Jia Wei, Cary, NC (US); Michael Jason Houston, Cary, NC (US); Akshat Shenoy, Cary, NC (US)

(73) Assignee: RENESAS ELECTRONICS AMERICA INC., Milpitas, CA (US)

( * ) Notice: Subject to any disclaimer, the term of this patent is extended or adjusted under 35 U.S.C. 154(b) by 95 days.

(21) Appl. No.: 18/541,537

(22) Filed: Dec. 15, 2023

(65) Prior Publication Data

US 2025/0199596 A1 Jun. 19, 2025

(51) Int. Cl.
*G06F 1/32* (2019.01)
*G05F 1/46* (2006.01)
*G06F 1/3206* (2019.01)
*H02J 7/00* (2006.01)

(52) U.S. Cl.
CPC ............ *G06F 1/3206* (2013.01); *G05F 1/462* (2013.01); *H02J 7/0063* (2013.01)

(58) Field of Classification Search
None
See application file for complete search history.

(56) References Cited

U.S. PATENT DOCUMENTS

| | | | | |
|---|---|---|---|---|
| 11,037,494 B1* | 6/2021 | Chang | ...................... | G09G 3/22 |
| 12,182,055 B1* | 12/2024 | Guo | ........................... | G06F 1/26 |
| 2011/0022859 A1* | 1/2011 | More | ...................... | G06F 1/3203 |
| | | | | 713/300 |
| 2011/0157934 A1* | 6/2011 | Clemo | ..................... | H02J 1/102 |
| | | | | 363/71 |
| 2016/0342186 A1* | 11/2016 | Ragupathi | ............... | G06F 1/189 |
| 2017/0060151 A1* | 3/2017 | Vaisband | .................. | G05F 1/46 |
| 2020/0075061 A1* | 3/2020 | Rowley | ................. | G06F 1/3296 |
| 2020/0313539 A1* | 10/2020 | Hall | ..................... | H02M 1/4233 |
| 2022/0286054 A1* | 9/2022 | Park | ..................... | G06F 13/4282 |
| 2023/0019075 A1* | 1/2023 | Seok | ......................... | G06F 1/30 |
| 2024/0013692 A1* | 1/2024 | Ryu | ......................... | G09G 3/20 |
| 2024/0297588 A1* | 9/2024 | Potlapalli | .............. | H02M 1/327 |

OTHER PUBLICATIONS

Buck Converters Proliferate in Handhelds as Features and Processing Power Increase, Sep. 16, 2005, maxim integrated, p. 2 (Year: 2005).*

* cited by examiner

*Primary Examiner* — Danny Chan
(74) *Attorney, Agent, or Firm* — SCULLY, SCOTT, MURPHY & PRESSER, P.C.

(57) ABSTRACT

Apparatuses, devices, and systems for controlling power supply to a load are described. A system can include a power stage and a power management integrated circuit (PMIC). The PMIC can include a controller configured to determine a load is operating under a low power mode. The controller can, in response to the load operating under the low power mode, operate the PMIC to supply power to the load. The controller can determine the load is operating under a high power mode. The controller can, in response to the load operating under the high power mode, operate at least one of the PMIC and the power stage to supply power to the load.

17 Claims, 4 Drawing Sheets

VOLTAGE REGULATOR CONTROL WITH SCALABLE POWER STAGE

BACKGROUND

The present disclosure relates in general to semiconductor devices. More specifically, the present disclosure relates to architectures for a scalable system where at least one of a local power management integrated circuit (PMIC) and external power stage can be operated for supplying power to a load.

In an aspect, a majority of the life of a computing device (e.g., computers, laptops, smart phones, wearable devices, tablet devices, or other computing devices) can be spent idling or in low power mode. Low power mode can be situations where a relatively low level of power is being consumed by the computing device. The computing device can operate in low power mode when the computer device performs low power tasks, such as web browsing, audio or video playback, or other low power tasks. During operations of the computer device under the low power device, tasks that consumes relatively higher level of power can cause the computer device to switch from the low power mode to a high power mode. The computing device can operate in high power mode when the computer device performs high power tasks, such as processing new inputs or launching new applications.

SUMMARY

In one embodiment, a system for controlling power supply to a load are described. The system can include a power stage and a power management integrated circuit (PMIC). The PMIC can include a controller configured to determine a load is operating under a low power mode. The controller can be further configured to, in response to the load operating under the low power mode, operate the PMIC to supply power to the load. The controller can be further configured to determine the load is operating under a high power mode. The controller can be further configured to, in response to the load operating under the high power mode, operate at least one of the PMIC and the power stage to supply power to the load.

In one embodiment, a device with scalable power supply to a load are described. The device can include a battery, a load, a power stage and a power management integrated circuit (PMIC). The PMIC can include a controller configured to determine the load is operating under a low power mode. The controller can be further configured to, in response to the load operating under the low power mode, operate the PMIC to convert an input voltage from the battery into a first output voltage to supply power to the load. The controller can be further configured to determine the load is operating under a high power mode. The controller can be further configured to, in response to the load operating under the high power mode, operate at least one of the PMIC and the power stage to convert the input voltage from the battery into a second output voltage to supply power to the load.

In one embodiment, an apparatus for controlling power supply to a load are described. The apparatus can include a power stage comprising at least a first switching converter. The apparatus can further include a power management integrated circuit (PMIC) comprising at least a second switching converter. The switching devices in the first switching converter of the power stage can be larger than switching devices in the second switching converter of the PMIC. The PMIC can be configured to convert an input voltage into a first output voltage to supply power to a load operating under a low power mode. The power stage can be configured to convert the input voltage into a second output voltage to supply power to a load operating under a high power mode.

Further features as well as the structure and operation of various embodiments are described in detail below with reference to the accompanying drawings. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1:
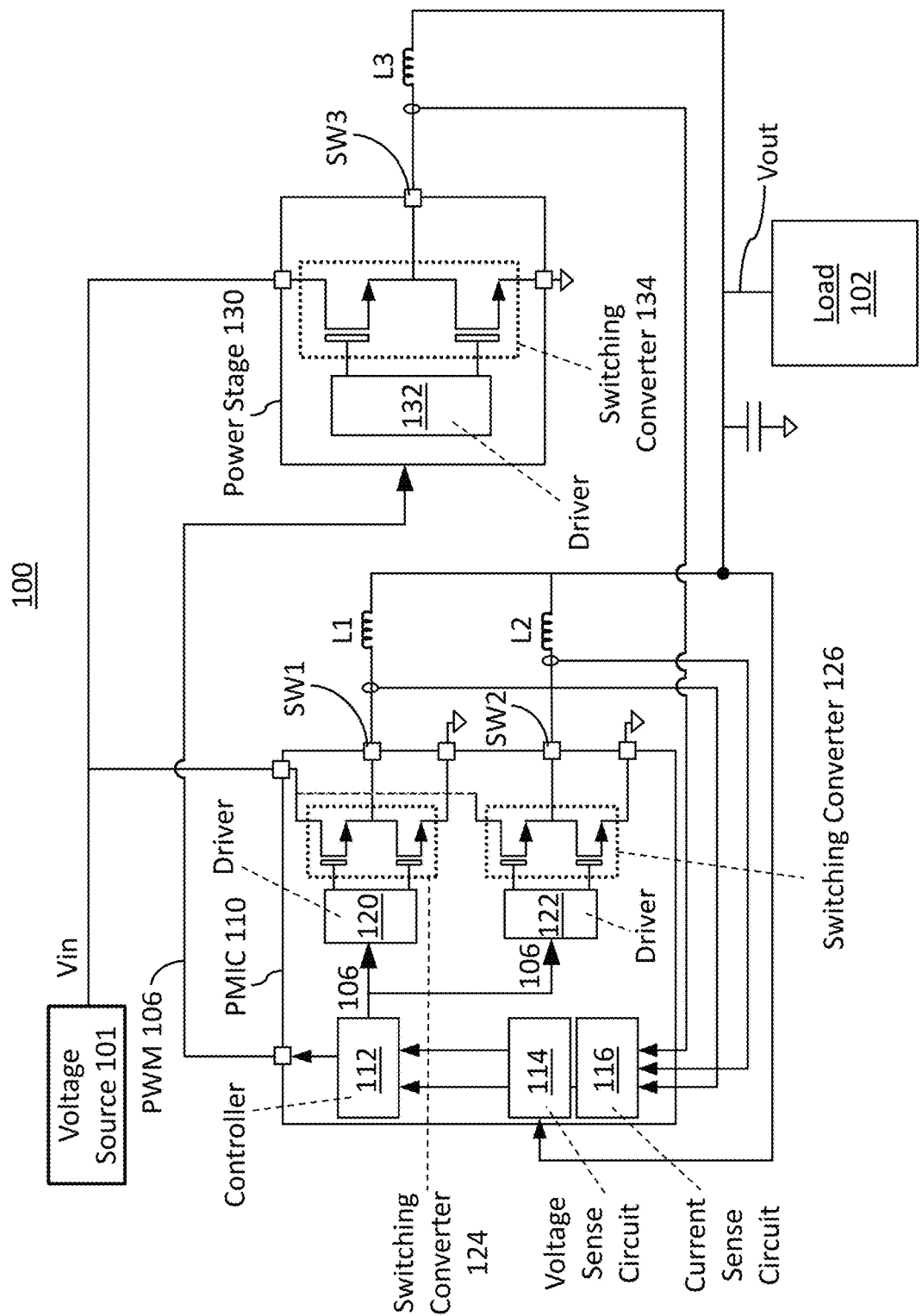
FIG. 1 is an example diagram of a semiconductor device that can implement voltage regulator control with scalable power stage in one embodiment.

FIG. 1 is an example diagram of a semiconductor device that can implement voltage regulator control with scalable power stage in one embodiment. System 100 can be implemented in a semiconductor package including one or more semiconductor devices. System 100 can include a voltage source 101, a load 102, a power management integrated circuit (PMIC) 110 and a power stage 130. System 100 can be part of a computing device such as a computer, a laptop, a smart phone, a wearable device, a tablet device, or other types of computing devices. Voltage source 101 can be, for example, power supply internal or external to a computing device including system 100. In one embodiment, voltage source 101 can be a battery or a battery pack including at least one battery. Load 102 can be, for example, a microprocessor, a single-core processor, a multi-core processor, or other types of processing hardware elements in a computing device. System 100 can convert an input voltage Vin into an output voltage Vout and Vout can be provided to load 102 to supply power to load 102.

PMIC 110 can include at least a controller 112, a voltage sense circuit 114, a current sense circuit 116, drivers 120, 122 and at least switching converter such as switching converters 124, 126. Controller 112 can be, for example, a microcontroller including hardware such as various analog and digital circuit components. Controller 112 can include, for example, a processor, central processing unit (CPU), field-programmable gate array (FPGA) or any other circuitry that is configured to control and operate various aspects of PMIC 110. Voltage sense circuit 114 can be a circuit configured to sense or measure voltage being outputted from one of PMIC 110 and power stage 130 to load 102. Current sense circuit 116 can be a circuit configured to sense or measure current flowing through either switch nodes SW1, SW2 of PMIC 110 or switch node SW3 of power stage 130. The number of switching converters in PMIC 110 can be arbitrary and additional switching converters can be added to accommodate higher current applications.

Each one of switching converters 124, 126 can include a respective pair of switches implemented by transistors such as various types of field-effect transistors (FETs), including metal-oxide-semiconductor field-effect transistors (MOSFETs). The pair of MOSFETs in switching converter 124 can be switched alternately to convert an input voltage Vin into a first voltage that can be outputted at switch node SW1. The pair of MOSFETs in switching converter 126 can be switched alternately to convert input voltage Vin into a second voltage that can be outputted at switch node SW2. The first and second voltages outputted at switch nodes SW1, SW2 can be combined into output voltage Vout. Controller 112 can further include a modulator configured to generate pulse width modulation (PWM) signals 106. Controller 112 can provide PWM signals 106 to drivers 120, 122. Drivers 120, 122 can be driver circuits configured to use PWM signals 106 to generate gate signals. The gate signals generated by drivers 120, 122 can be used driving the gates of the pairs of transistors in switching converters 124, 126 in order to alternately switch the pairs of transistors in switching converters 124, 126.

Power stage 130 can be an external power stage, such as a power stage that is external to PMIC 110 and/or external to a computing device including system 100. Power stage 130 can include at least a driver 132 and a switching converter 134. Switching converters 134 can include a pair of switches implemented by transistors such as MOSFETs. The pair of MOSFETs in switching converter 134 can be switched alternately to convert input voltage Vin into a third voltage that can be outputted at switch node SW3 as output voltage Vout. Controller 112 can provide PWM signals 106 to driver 132 and drivers 132 can be a driver circuit configured to use PWM signals 106 to generate gate signals. The gate signals generated by driver 132 can be used for driving the gates of the pair of transistors in switching converter 134 in order to alternately switch the pairs of transistors in switching converter 134. The number of switching converters in power stage 130 can be arbitrary and additional switching converters can be added to accommodate higher current applications.

In an aspect, a computing device that includes system 100 can operate under various operating states or modes, such as an idle mode, a low power mode, or a high power mode, depending on an amount of power being demanded by load 102. Idle mode can be when load 102 is in an adle state and does not demand power. Low power mode can be, for example, when load 102 demands a relatively low amount of power. High power mode can be, for example, when load 102 demands a relatively high amount of power. During operations under idle mode or low power mode, load 102 can demand relatively higher level of power and system 100 may need to switch into operations under high power mode.

In the embodiment shown in FIG. 1, the pair of transistors in switching converter 136 of power stage 130 can be larger than the pairs of transistors of switching converters 124, 126 in PMIC 110. Due to the size difference, the voltage conversion being performed by PMIC 110 and power stage 130 can output different output voltages despite the fact that the same input voltage Vin is being supplied to both PMIC 110 and power stage 130 for the conversion. By way of example, since the pair of transistors in switching converter 134 are larger, power stage 130 can be configured to convert Vin into a higher Vout when compared to PMIC 110. If the computing device including system 100 operates in high power mode, using PMIC 110 alone to convert Vin into Vout may not provide sufficient power to load 102 that demands high power. Further, although PMIC 110 can have lower switching losses due to having smaller devices or transistors in switching converters 124, 126, operating PMIC 110 alone in high power mode can require higher currents that can increase conduction loss in PMIC 110 due to the smaller devices having higher turn on resistance (RDSon). If the computing device including system 100 operates in low power mode, using power stage 130 alone, or using both PMIC 110 and power stage 130, to convert Vin into Vout may be inefficient because the larger transistor pair in switching converter 134 can require relatively more quiescent current to be powered up and switched.

To allow the computing device including system 100 to operate under low power mode and high power mode efficiently, PMIC 110 and power stage 130 can be installed in the same computing device that includes system 100. Controller 112 can be configured to monitor various parameters and/or operating conditions and use the monitored parameters and/or operating conditions to determine whether load 102 is operating under low power mode or high power mode. Depending on whether load 102 is operating under low power mode or high power mode, controller 112 can determine whether to operate PMIC 110, power stage 130, or PMIC 110 and power stage 130 at the same time, to convert Vin into different output voltages Vout for load 102. In one or more embodiments, the parameters and/or operating conditions that can be monitored by controller 112 can include, but not limited to, a load current of load 102, output voltage Vout, an ambient temperature of PMIC 110, known operating power state of system 100, a power demand from load 102, or other parameters and/or operating conditions.

By including both PMIC 110 and power stage 130 in the same computing device, and by monitoring the parameters and operating conditions of the computing device, controller 112 can determine appropriate times to use one or more of PMIC 110 and power stage 130 to optimize an efficiency of the computing device. The smaller transistors in switching converters 124, 126 of PMIC 110 can be used for lower power demand from load 102 in order to reduce switching loss. The larger transistors in switching converter 134 of power stage 130 can be used for higher power demand from load 102 to reduce conduction loss. Further, using one controller (e.g., controller 112) to control both PMIC 110 and power stage 130 can reduce build of materials (BOM) costs when compared to systems that require separate controllers for PMIC and external power stage. Furthermore, the number of phases (e.g., switching converters) in PMIC 110 and/or power stage 130 can be configurable to fine tune the different levels of power that can be provided to load 102. In one embodiment, relatively low cost components can be used for power stage 130 such that the costs for building system 100 can be relatively low. Also, controller 112 can perform protection features such as overcurrent protection and undervoltage protection for both PMIC 110 and power stage 130 such that these protection features can be shared and system 100 does not require more than one controller. In embodiments where voltage source 101 is a battery, the selection of one or more of PMIC 110 and power stage 130 to supply power to load 102 can improve efficiency of system 100 and also preserve the battery life of the battery.

Figure 2:
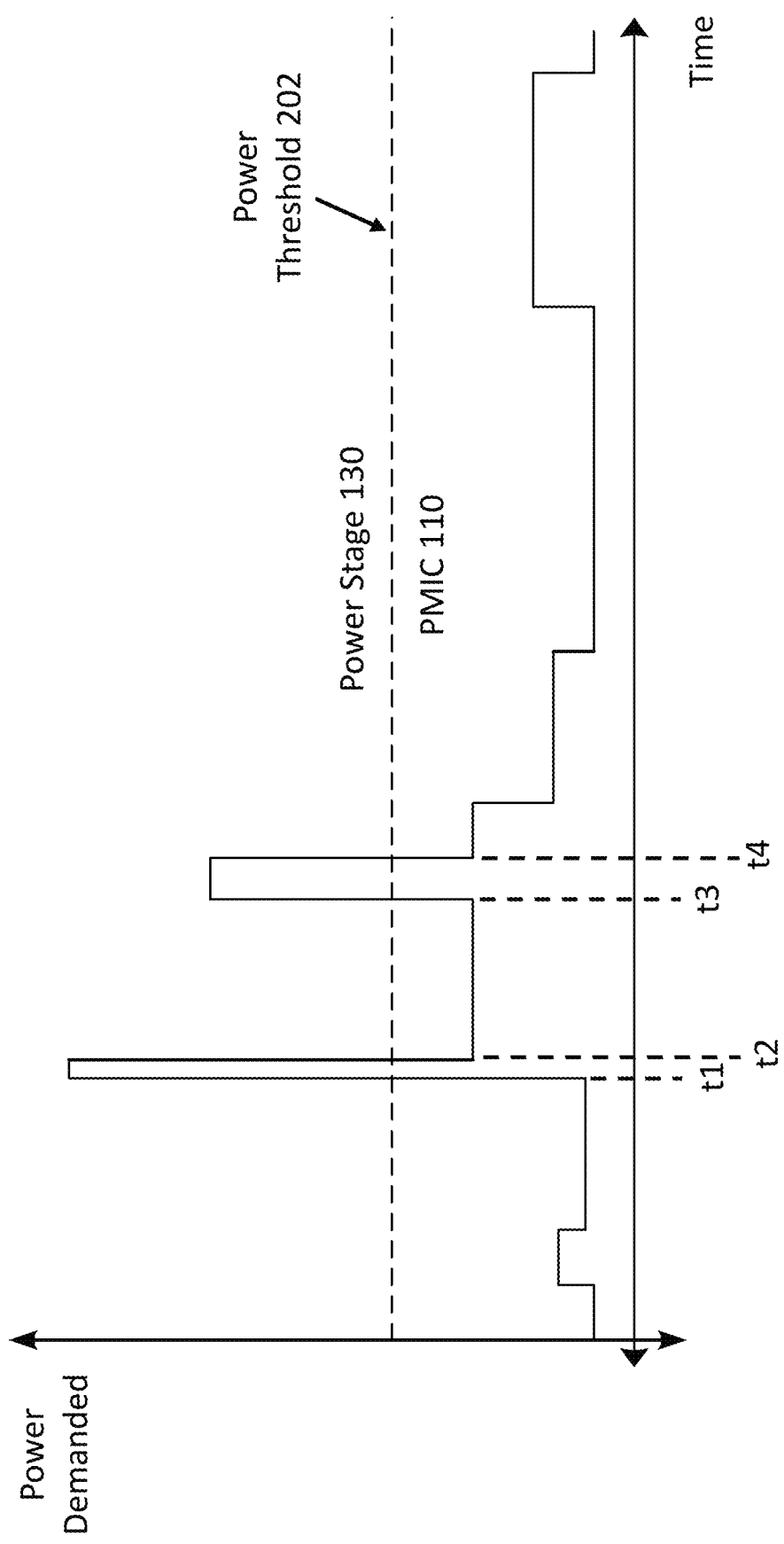
FIG. 2 is an example diagram showing an impact of power levels being demanded by a load on operations of voltage regulator control with scalable power stage in one embodiment.

FIG. 2 is an example diagram showing an impact of power levels being demanded by a load on operations of voltage regulator control with scalable power stage in one embodiment. Descriptions of FIG. 2 can reference components shown in FIG. 1. In an embodiment shown in FIG. 2, controller 112 can monitor a power demand from load 102. A power demand threshold 202 and the monitored power demand can be used by controller 112 to determine whether to operate PMIC 110, power stage 130, or a combination of PMIC 110 and power stage 130 to provide power to load 102. In one embodiment, power demand threshold 202 can be programmable and can be stored in a memory device of PMIC 110. In one embodiment, voltage sense circuit 114 can monitor Vout being provided to load 102 and current sense circuit 116 can monitor the load current of load 102. Controller 112 can obtain the sensed Vout and load current from voltage sense circuit 114 and current sense circuit 116, respectively. Controller can use the sensed Vout and load current to determine the power demand of load 102 (e.g., power demand being a product of the sensed Vout and the load current).

Using the example shown in FIG. 2, before a time t1, the power demand from load 102 can be below power demand threshold 202 and controller 112 can operate PMIC 110 to generate a first Vout (e.g., a lower Vout) for providing power to load 102 while keeping power stage 130 deactivated. At time t1, the power demand from load 102 can exceed power demand threshold 202 and controller 112 can either 1) operate power stage 130 to generate a second Vout (e.g., higher Vout) for providing power to load 102 while keeping PMIC 110 deactivated, or 2) operate PMIC 110 and power stage 130 together to generate the third Vout for providing power to load 102. The second Vout can be greater than the first Vout and the third Vout can be greater than the second Vout.

At time t2, the power demand from load 102 can fall below power demand threshold 202 and controller 112 can return to operating PMIC 110 to generate the first Vout for providing power to load 102 while keeping power stage 130 deactivated. At time t3, the power demand from load 102 can exceed power demand threshold 202 again and controller 112 can either 1) operate power stage 130 to generate the second Vout for providing power to load 102 while keeping PMIC 110 deactivated, or 2) operate PMIC 110 and power stage 130 together to generate the third Vout for providing power to load 102. Also at time t4, the power demand from load 102 can fall below power demand threshold 202 and controller 112 can return to operating PMIC 110 to generate the first Vout for providing power to load 102 while keeping power stage 130 deactivated.

Figure 3:
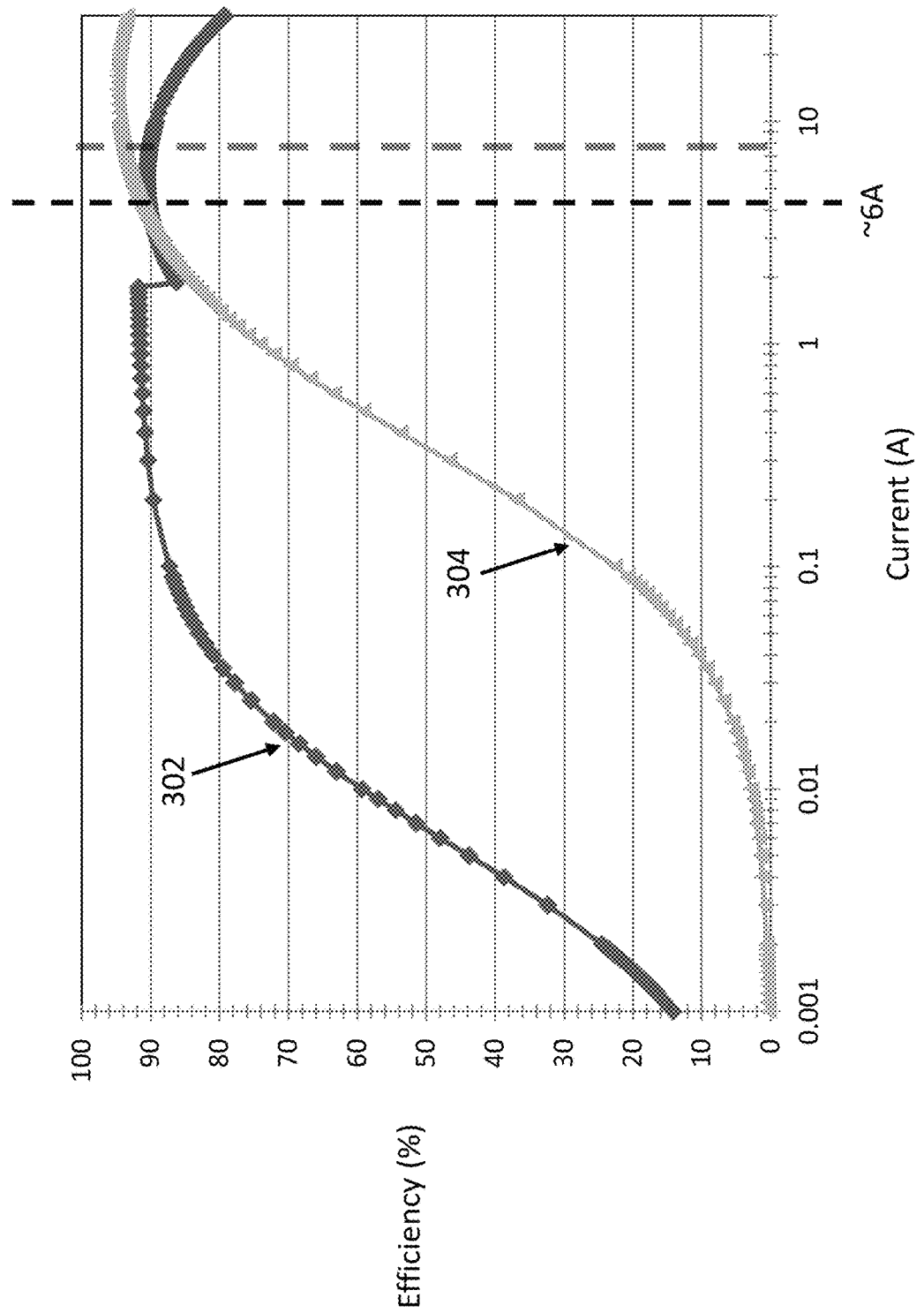
FIG. 3 is an example diagram showing an impact of load current on operations of voltage regulator control with scalable power stage in one embodiment.

FIG. 3 is an example diagram showing an impact of load current on operations of voltage regulator control with scalable power stage in one embodiment. Descriptions of FIG. 3 can reference components shown in FIG. 1 to FIG. 2. In an embodiment shown in FIG. 2, current sense circuit 116 in controller 112 can monitor load current of load 102. In one embodiment, a memory device of PMIC 110 can store mappings between different load currents to different efficiencies (e.g., a percentage) of system 100. In the example shown in FIG. 3, a curve 302 represents the mappings of the efficiency of system 100 to different load currents when PMIC 110 is generating and supplying Vout to load 102. Also in the example shown in FIG. 3, a curve 304 represents the mappings of the efficiency of system 100 to different load currents when power stage 130 is generating and supplying Vout to load 102.

As indicated by the example shown in FIG. 3, as the load current increases, the efficiency shown by both curve 302 and 304 can increase up until a certain load current. For lower load currents, such as load current less than 6 amperes (A), the efficiency of using PMIC 110 can be greater than the efficiency of using power stage 130. For higher load currents, such as load current greater than 6 amperes (A), the efficiency of using PMIC 110 can be lower than the efficiency of using power stage 130. In one embodiment, controller 112 can be configured to use mappings, which can be stored as digital data represented by curves 302, 304 shown in FIG. 3, to determine whether to use PMIC 110, power stage 130, or a combination of PMIC 110 and power stage 130 to generate Vout. By way of example, if a load current being monitored by current sense circuit 116 is below a predefined threshold, such as 6A, then controller 112 can operate PMIC 110 to generate a first Vout (e.g., lower Vout) for providing power to load 102 while keeping power stage 130 deactivated. If a load current being monitored by current sense circuit 116 is above the predefined threshold, such as 6A, then controller 112 can either 1) operate power stage 130 to generate a second Vout (e.g., higher Vout) for providing power to load 102 while keeping PMIC 110 deactivated, or 2) operate PMIC 110 and power stage 130 together to generate the third Vout for providing power to load 102.

Figure 4:
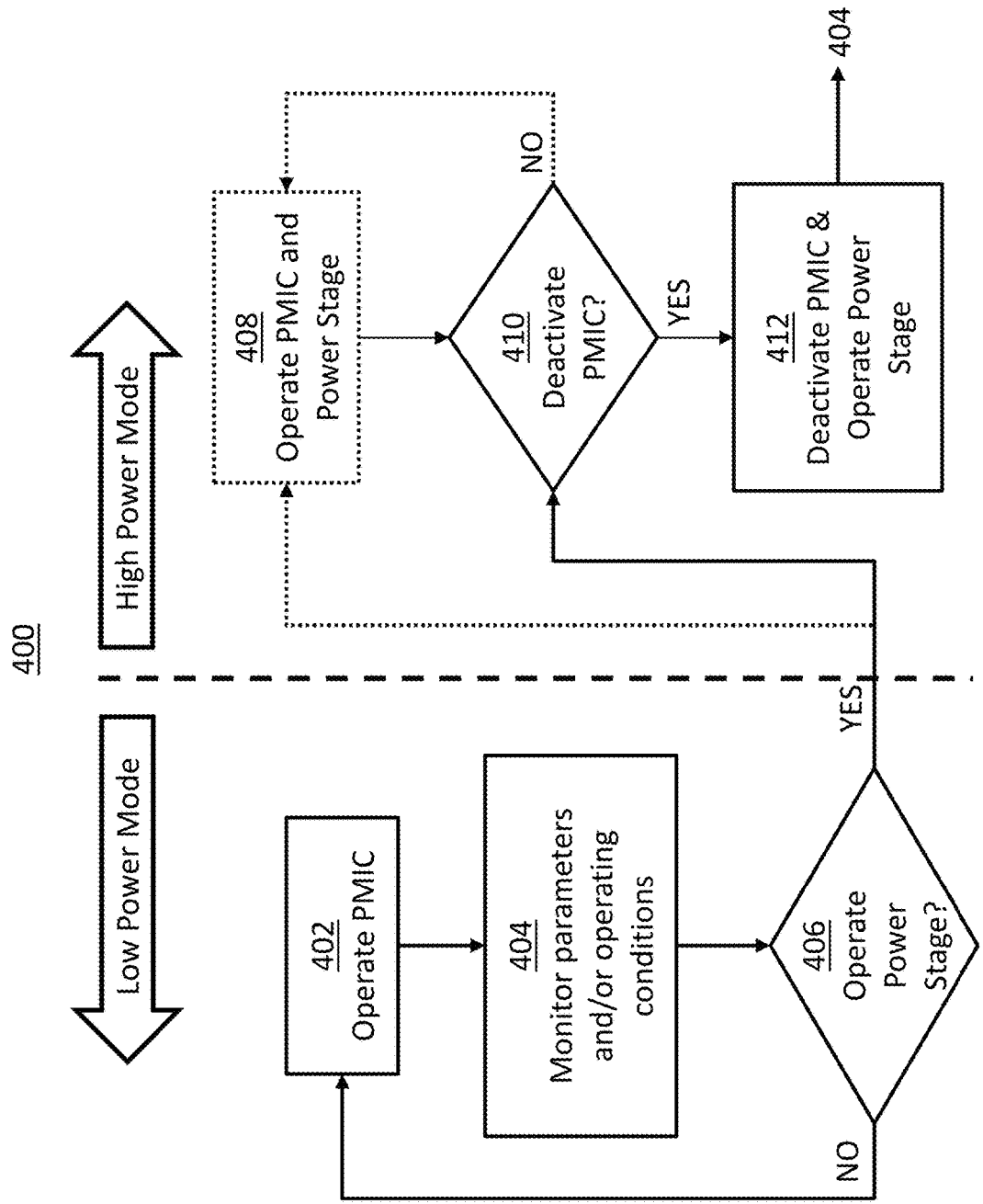
FIG. 4 is a flow diagram illustrating a process to implement voltage regulator control with scalable power stage in one embodiment.

FIG. 4 is a flow diagram illustrating a process to implement voltage regulator control with scalable power stage in one embodiment. The process can include one or more operations, actions, or functions as illustrated by one or more of blocks 402, 404, 406, 408, 410 and/or 412. Although illustrated as discrete blocks, various blocks can be divided into additional blocks, combined into fewer blocks, eliminated, performed in different order, or performed in parallel, depending on the desired implementation.

Descriptions of FIG. 4 can reference components shown in FIG. 1 to FIG. 3. Process 400 can be performed by controller 112 described herein. Process 400 can begin at block 402. At block 402, load 102 can operate under low power mode and controller 112 can operate PMIC 110 to generate a first Vout (e.g., lower Vout) and supply the first Vout to load 102. Also at block 402, power stage 130 can be deactivated. Process 400 can proceed from block 402 to block 404. At block 404, controller 112 can monitor parameters and/or operating conditions of load 102 to determine whether load 102 is operating under low power mode or high power mode. The parameters and/or operating conditions being monitored at block 404 can include, but not limited to, a load current of load 102, output voltage Vout, an ambient temperature of PMIC 110, known operating power state of system 100, a power demand from load 102, or other parameters and/or operating conditions.

Process 400 can proceed from block 404 to block 406. At block 406, controller 112 can determine whether to operate power stage 130 or not. In one embodiment, controller 112 (or current sense circuit 116) can monitor a load current of load 102 (see FIG. 3 and corresponding descriptions) to determine whether to operate power stage 130 or not. By way of example, if a load current of load 102 results in better efficiency when using PMIC 110, then controller 112 can determine that load 102 can continue to operate under low power mode and PMIC 110 shall continue to generate and provide the first Vout to load 102, and process 400 can return to block 402. If a load current of load 102 results in better efficiency when using power stage 130, then controller 112 can determine that load 102 can operate under high power mode and power stage 130 shall be activated and process 400 can proceed to block 408 or block 410.

In one embodiment, controller 112 (or voltage sense circuit 114) can monitor Vout being provided to load 102. Controller 112 can use the monitored Vout, along with monitored load current of load 102, to determine power being demanded by load 102 (see FIG. 2 and corresponding descriptions). Controller 112 can determine whether to operate power stage 130 or not based on the power being demanded by load 102. By way of example, if load 102 demands power that is less than power demand threshold 202 (see FIG. 2), then controller 112 can determine that load 102 can continue to operate under low power mode and PMIC 110 shall continue to generate and provide the first Vout to load 102, and process 400 can return to block 402. If load 102 demands power that is greater than power demand threshold 202, then controller 112 can determine that load 102 can operate under high power mode and power stage 130 shall be activated and process 400 can proceed to block 408 or block 410.

In one embodiment, controller 112 can include at least one temperature sensor configured to measure an ambient temperature of PMIC 110. PMIC 110 can also include a memory device configured to store a temperature threshold. Controller 112 can determine whether the ambient temperature of PMIC 110 is greater than or less than the temperature threshold. In response to the ambient temperature of PMIC 110 being less than the temperature threshold, controller 112 can determine that load 102 can continue to operate under low power mode and PMIC 110 shall continue to generate and provide the first Vout to load 102, and process 400 can return to block 402. In response to the ambient temperature of PMIC 110 being greater than the temperature threshold, controller 112 can determine that load 102 can operate under high power mode and power stage 130 shall be activated to reduce a workload of PMIC 110 and process 400 can proceed to block 408 or block 410.

In one embodiment, an operating power state or mode of system 100 can be known to controller 112. The operating state of system 100 can include, for example, idle mode, low power mode, high power mode, or other operating power modes. Idle mode can be when load 102 is in an idle state and does not demand power. Low power mode can be, for example, when load 102 demands a relatively low amount of power. High power mode can be, for example, when load 102 demands a relatively high amount of power. In response to system 100 operating in idle mode or low power mode, controller 112 can determine that PMIC 110 shall continue to generate and provide the first Vout to load 102, and process 400 can return to block 402. In response to system 100 operating in high power mode, controller 112 can determine that power stage 130 shall be activated to reduce a workload of PMIC 110 and process 400 can proceed to block 408 or block 410.

In one embodiment, block 408 can be an optional block and process 400 can proceed to block 408 to perform handshaking prior to proceeding to block 410. At block 408, controller 112 can activate power stage 130. The activation of power stage 130 at block 408 can cause both PMIC 110 and power stage 130 to be activated. Thus, controller 112 can operate both PMIC 110 and power stage 130 to generate a third Vout and provide the third Vout to load 102. The handshaking can allow a seamless transition from operating PMIC 110 to operating power stage 130 without interruption of power supply to load 102. When process 400 proceeds to optional block 408 to perform the handshaking, controller 112 can operate PMIC 110 and power stage 130 simultaneously for a predefined amount of handshaking time before proceeding to block 410.

If controller 112 does not perform the handshaking at optional block 408, process 400 can proceed from block 406 to block 410. At block 410, controller 112 can determine whether to continue to operate PMIC 110 or to deactivate PMIC 110. In the embodiment where handshaking is performed at optional block 408, controller 112 can wait for a lapse of the predefined amount of handshaking time. In response to the lapse of the predefined amount of handshaking time, controller 112 can determine that PMIC 110 can be deactivated and proceed to block 412 to deactivate PMIC 110.

In one embodiment, controller 112 can determine to operate both PMIC 110 and power stage 130 to generate the third Vout and supply the third Vout to load 102 when load 102 demands significantly high amount of power. By way of example, referring to FIG. 2, if the power demand from load 102 exceeds power demand threshold 202 by a predefined factor (e.g., exceed power demand threshold 202 by X %), then controller 112 can determine to continue operating both PMIC 110 and power stage 130 at block 410 and return to block 408 to maintain activation of both PMIC and power stage 130.

At block 412, controller 112 can deactivate PMIC 110 and operate power stage 130 to generate the second Vout and provide the second Vout to load 102. Process 400 can return to block 404 to continue monitoring parameters and/or operating conditions of load 102. The second Vout can be greater than the first Vout and the third Vout can be greater than the second Vout.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A system comprising:
a power stage including a first switching converter; and
a power management integrated circuit (PMIC) comprising a controller and at least two switching converters, wherein the power stage is external to the PMIC, and the controller in the PMIC is configured to:
determine a load is operating under a low power mode;
in response to the load operating under the low power mode, operate the at least two switching converters in the PMIC to supply power to the load;
detect a switch of the load from the low power mode to a high power mode;
in response to the load switch from the low power mode to the high power mode:
maintain operation of the at least two switching converters in the PMIC to supply power to the load; and
activate operation of the first switching converter in the power stage external to the PMIC to supply power to the load;
determine a predefined amount of handshaking time in which the at least two switching converters in the PMIC and the first switching converter in the power stage external the PMIC are activated has lapsed; and
in response to lapse of the predefined amount of handshaking time:
deactivate the at least two switching converters in the PMIC; and
maintain operation of the first switching converter in the power stage external the PMIC to supply power to the load;
determine a demand of the load exceeds a power demand threshold by a predefined factor; and
in response to the load demand exceeding a power demand threshold by a predefined factor, operate the first switching converter in the power stage external to the PMIC, and the at least two switching converters in the PMIC to supply power to the load.

2. The system of claim 1, wherein the controller is configured to:
in response to a power demand of the load being less than a predefined power demand threshold, determine that the load is operating under the low power mode; and
in response to a power demand of the load being greater than a predefined power demand threshold, determine that the load is operating under the high power mode.

3. The system of claim 1, wherein the controller is configured to:
measure a load current of the load;
determine a first efficiency of the system corresponding to the PMIC and the load current;
determine a second efficiency of the system corresponding to the power stage and the load current;
identify a higher efficiency among the first efficiency and the second efficiency;
in response to the first efficiency being identified as the higher efficiency, determine that the load is operating under the low power mode; and
in response to the second efficiency being identified as the higher efficiency, determine that the load is operating under the high power mode.

4. The system of claim 1, wherein the controller is configured to:
in response to an ambient temperature of the PMIC being less than a predefined temperature threshold, determine that the load is operating under the low power mode; and
in response to the ambient temperature of the PMIC being greater than a predefined temperature threshold, determine that the load is operating under the high power mode.

5. The system of claim 1, wherein the controller is configured to:
determine the load is in an idle mode; and
in response to the load being in the idle mode, operate the at least two switching converters in the PMIC and deactivate the first switching converter in the power stage external to the PMIC to supply power to the load.

6. A device comprising:
a battery;
a load;
a power stage including a first switching converter; and
a power management integrated circuit (PMIC) comprising a controller and at least two switching converters, wherein the power stage is external to the PMIC, and the controller in the PMIC is configured to:
determine the load is operating under a low power mode;
in response to the load operating under the low power mode, operate at least two switching converters in the PMIC to convert an input voltage from the battery into a first output voltage to supply power to the load;
detect a switch of the load from the low power mode to a high power mode;
in response to the load switch from the low power mode to the high power mode:
maintain operation of the at least two switching converters in the PMIC to supply power to the load; and
activate operation of the first switching converter in the power stage external to the PMIC to supply power to the load;
determine a predefined amount of handshaking time in which the at least two switching converters in the PMIC and the first switching converter in the power stage external the PMIC are activated has lapsed; and
in response to lapse of the predefined amount of handshaking time:
deactivate the at least two switching converters in the PMIC; and
maintain operation of the first switching converter in the power stage external the PMIC to supply power to the load;
determine a demand of the load exceeds a power demand threshold by a predefined factor; and in response to the load demand exceeding a power demand threshold by a predefined factor, operate the first switching converter in the power stage external to the PMIC, and the at least two switching converters in the PMIC to convert the input voltage from the battery into a second output voltage to supply power to the load.

7. The device of claim 6, wherein the controller is configured to, in response to the load operating under the high power mode, operate the at least two switching converters in the PMIC and the first switching converter in the power stage external to the PMIC to supply power to the load.

8. The device of claim 6, wherein the controller is configured to, in response to the load operating under the high power mode, operate the first switching converter in the power stage external to the PMIC and deactivate the at least two switching converters in the PMIC to supply power to the load.

9. The device of claim 6, wherein the controller is configured to:
   detect a switch of the load from the low power mode to the high power mode;
   in response to the load switch from the low power mode to the high power mode:
      maintain operation of the at least two switching converters in the PMIC to supply power to the load; and
      activate operation of the first switching converter in the power stage external to the PMIC to supply power to the load;
   determine a predefined amount of time in which the at least two switching converters in the PMIC and the first switching converter in the power stage external the PMIC are activated has lapsed; and
   in response to lapse of the predefined amount of time:
      deactivate the at least two switching converters in the PMIC; and
      maintain operation of the first switching converter in the power stage external the PMIC to supply power to the load.

10. The device of claim 6, wherein the controller is configured to:
   in response to a power demand of the load being less than a predefined power demand threshold, determine that the load is operating under the low power mode; and
   in response to a power demand of the load being greater than a predefined power demand threshold, determine that the load is operating under the high power mode.

11. The device of claim 6, wherein the controller is configured to:
   measure a load current of the load;
   determine a first efficiency of the device corresponding to the PMIC and the load current;
   determine a second efficiency of the device corresponding to the power stage and the load current;
   identify a higher efficiency among the first efficiency and the second efficiency;
   in response to the first efficiency being identified as the higher efficiency, determine that the load is operating under the low power mode; and
   in response to the second efficiency being identified as the higher efficiency, determine that the load is operating under the high power mode.

12. The device of claim 6, wherein the controller is configured to:

in response to an ambient temperature of the PMIC being less than a predefined temperature threshold, determine that the load is operating under the low power mode; and
in response to the ambient temperature of the PMIC being greater than a predefined temperature threshold, determine that the load is operating under the high power mode.

13. The device of claim 6, wherein the controller is configured to:
   determine the load is in an idle mode; and
   in response to the load being in the idle mode, operate the at least two switching converters in the PMIC and deactivate the first switching converter in the power stage external to the PMIC to supply power to the load.

14. An apparatus comprising:
   a power stage comprising at least a first switching converter; and
   a power management integrated circuit (PMIC) comprising a controller and at least a second switching converter, wherein:
      switching devices in the first switching converter of the power stage are larger than switching devices in the second switching converter of the PMIC;
      the power stage is external to the PMIC; and
      the controller in the PMIC is configured to:
         operate the second switching converter in the PMIC to convert an input voltage into a first output voltage to supply power to a load operating under a low power mode;
         detect a switch of the load from the low power mode to a high power mode;
         in response to the load switch from the low power mode to the high power mode:
            maintain operation of the at least second switching converter in the PMIC to supply power to the load; and
            activate operation of the first switching converter in the power stage external to the PMIC to supply power to the load;
         determine a predefined amount of handshaking time in which the second switching converter in the PMIC and the first switching converter in the power stage external the PMIC are activated has lapsed; and
         in response to lapse of the predefined amount of handshaking time:
            deactivate the second switching converter in the PMIC; and
            maintain operation of the first switching converter in the power stage external the PMIC to supply power to the load;
         determine a demand of the load exceeds a power demand threshold by a predefined factor; and
         in response to the load demand exceeding a power demand threshold by a predefined factor, operate the first switching converter in the power stage external to the PMIC and the second switching converter in the PMIC to convert the input voltage into a second output voltage to supply power to the load operating under a high power mode.

15. The apparatus of claim 14, wherein:
   the low power mode is defined by a power demand of the load being less than a predefined power demand threshold; and the high power mode is defined by the power demand of the load being greater than a predefined power demand threshold.

16. The apparatus of claim 14, wherein:

the low power mode is defined by an ambient temperature of the PMIC being less than a predefined temperature threshold; and the high power mode is defined by the ambient temperature of the PMIC being greater than a predefined temperature threshold.

17. The apparatus of claim 14, wherein:

the controller in the PMIC is configured to operate the second switching converter in the PMIC to convert the input voltage into the first output voltage to supply power to a load operating under an idle mode.

* * * * *